United States Patent
Ashida

(10) Patent No.: US 10,665,442 B2
(45) Date of Patent: May 26, 2020

(54) MASS SPECTROMETER

(71) Applicant: SHIMADZU CORPORATION, Kyoto-shi, Kyoto (JP)

(72) Inventor: Takeshi Ashida, Kyoto (JP)

(73) Assignee: SHIMADZU CORPORATION, Kyoto-shi, Kyoto (JP)

(*) Notice: Subject to any disclaimer, the term of this patent is extended or adjusted under 35 U.S.C. 154(b) by 0 days.

(21) Appl. No.: 16/080,535

(22) PCT Filed: Feb. 29, 2016

(86) PCT No.: PCT/JP2016/056058
§ 371 (c)(1),
(2) Date: Jan. 18, 2019

(87) PCT Pub. No.: WO2017/149603
PCT Pub. Date: Sep. 8, 2017

(65) Prior Publication Data
US 2019/0139748 A1 May 9, 2019

(51) Int. Cl.
*H01J 49/00* (2006.01)
*G01N 27/62* (2006.01)

(52) U.S. Cl.
CPC .......... *H01J 49/0072* (2013.01); *G01N 27/62* (2013.01)

(58) Field of Classification Search
USPC ....................................................... 250/288
See application file for complete search history.

(56) References Cited

U.S. PATENT DOCUMENTS 8,068,990 B2* 11/2011 Rosenfeld ............ G01N 33/689
702/19
8,187,893 B2* 5/2012 Hunter ............... G01N 33/6848
436/173
9,459,258 B2* 10/2016 Tang .................. G01N 33/6848
(Continued)

FOREIGN PATENT DOCUMENTS

CN 104569234 A 4/2015
JP 2012-104389 A 5/2012
(Continued)

OTHER PUBLICATIONS

Computer-generated English translations of JP 2013-15485 A.
(Continued)

*Primary Examiner* — Phillip A Johnston
(74) *Attorney, Agent, or Firm* — Sughrue Mion, PLLC

(57) ABSTRACT

A mass spectrometer is provided that includes a precursor ion candidate selector, a product ion scan measurement condition setter, a product ion spectral data obtainer, a compound database file generator, and an MRM measurement condition candidate generator. The precursor ion candidate selector selects precursor ion candidates from mass spectrometric data. The product ion scan measurement condition setter combines the precursor ion candidates with a plurality of candidate values of cleavage energy to set a product ion scan measurement condition. The product ion spectral data obtainer carries out MS/MS measurement to obtain product ion spectral data. The compound database file generator generates a compound database file in which the product ion scan measurement condition and the product ion spectral data are associated with each other.

6 Claims, 5 Drawing Sheets

(56) References Cited

U.S. PATENT DOCUMENTS

| | | | |
|---|---|---|---|
| 10,288,589 B2* | 5/2019 | Kudo | H01J 49/0036 |
| 10,352,942 B2* | 7/2019 | Grote | G01N 33/53 |
| 2013/0221214 A1 | 8/2013 | Shiohama | |
| 2013/0297230 A1 | 11/2013 | Kawase | |
| 2015/0102219 A1 | 4/2015 | Yamamoto | |
| 2015/0254433 A1* | 9/2015 | Macher | A61K 31/436 |
| | | | 514/49 |
| 2017/0032947 A1 | 2/2017 | Kobayashi et al. | |

FOREIGN PATENT DOCUMENTS

| | | |
|---|---|---|
| JP | 2013-015485 A | 1/2013 |
| JP | 2013-142581 A | 7/2013 |
| JP | 2015-076338 A | 4/2015 |
| WO | 2015/079529 A1 | 6/2015 |

OTHER PUBLICATIONS

Computer-generated English translations of JP 2013-142581 A.
Communication dated Mar. 19, 2019 issued by the Japanese Patent Office in counterpart application No. 2018-502870.
Written Opinion for PCT/JP2016/056058 dated Apr. 19, 2016 (PCT/ISA/237).
International Search Report for PCT/JP2016/056058 dated Apr. 19, 2016 [PCT/ISA/210].
Communication dated Jan. 8, 2020, from the European Patent Office in European Application No. 16892448.8.
"Automatic Optimization of Transitions and Collision Energies", Application Data Sheet No. 98, Shimadzu Excellence in Science, May 1, 2014, pp. 1-2 (2 pages total).

\* cited by examiner

Fig. 2

|  | TARGET COMPOUND | PRECURSOR ION | CE VALUE |
|---|---|---|---|
| EVENT 1 | COMPOUND A | A1 | 5eV |
| EVENT 2 | COMPOUND A | A1 | 10eV |
| ... | ... | ... | ... |
| EVENT 10 | COMPOUND A | A1 | 50eV |
| EVENT 11 | COMPOUND A | A2 | 5eV |
| ... | ... | ... | ... |
| EVENT 20 | COMPOUND A | A2 | 50eV |
| EVENT 21 | COMPOUND A | A3 | 5eV |
| ... | ... | ... | ... |
| EVENT 30 | COMPOUND A | A3 | 50eV |
| EVENT 31 | COMPOUND B | B1 | 5eV |
| ... | ... | ... | ... |

Fig. 5

LIST OF MRM MEASUREMENT CONDITIONS

COMPOUND A

| MRM | MRM TRANSITION ||  CE VALUE |
| --- | --- | --- | --- |
|  | PRECURSOR ION | PRODUCT ION |  |
| EVENT 1 | 150 | 41 | 30eV |
| ... | ... | ... | ... |
| ... | ... | ... | ... |

GO    CANCEL

MASS SPECTROMETER

CROSS REFERENCE TO RELATED APPLICATIONS

This application is a National Stage of International Application No. PCT/JP2016/056058 filed Feb. 29, 2016.

TECHNICAL FIELD

The present invention relates to a mass spectrometer in which conditions for measurement are readily determined when a target compound included in a sample is measured by multiple reaction monitoring (MRM).

BACKGROUND ART

MS/MS analysis (tandem mass analysis) is one of the known mass analysis techniques available to identify and/or quantify a target compound included in a sample. The MS/MS analysis may be performed with a mass spectrometer equipped with a front-stage mass separator, a collision cell, and a rear-stage mass separator. The front-stage mass separator selects, as precursor ions, ions of a particular mass-to-charge ratio. The collision cell dissociates the precursor ions and produces product ions. The rear-stage mass separator selectively allows passage of the product ions of a particular mass-to-charge ratio.

MRM measurement is one of methods for measurement used in the MS/MS analysis. The MRM measurement, using fixed mass-to-charge ratios for ions passing through the front- and rear-stage mass separators, measures the intensity amount) of a particular product ion produced from a particular precursor ion. A set of this precursor ion and product ion is called MRM transition.

The MRM measurement, when performed for a target compound, requires an MRM measurement condition to be determined and set beforehand. Conventionally, an analyst determines the MRM measurement condition referring to a compound database in which one or more candidates of MRM measurement condition are stored for each of numerous compounds. An MRM measurement condition candidate includes an MRM transition and a value of dissociation energy (also called collision energy or CE).

In the compound database are stored selected measurement conditions that allow high-sensitivity detection of product ions based on results of exhaustive preliminary measurements of standard samples prepared from compounds which are performed under conditions that differ in at least one of the MRM transition and the dissociation energy value. Therefore, an MRM measurement condition suitable for a target compound may be determined with reference to the compound database, and measurement performed under the MRM measurement condition thus determined allows high-sensitivity detection of the product ions of the target compound (for example, Patent Literatures 1 and 2).

CITATION LIST

Patent Literature

Patent Literature 1: JP 2013-15485 A
Patent Literature 2: JP 2012-104389 A

SUMMARY OF INVENTION

Technical Problem

A sample actually measured (actual sample), however, may often include a foreign compound(s) other than a target compound. If such a foreign compound includes any substance that produces precursor ions and product ions of the same mass-to-charge ratio as that of the MRM transition included in the MRM measurement condition set for the target compound, the product ions of the target compound and of the foreign compound may be both detected. As a result, accurate measurement of the target compound may be compromised. When an actual sample is subjected to the MRM measurement, therefore, it is necessary to select, among the candidates of MRM measurement condition stored in the compound database, a candidate least affected by such a foreign compound and to determine a suitable MRM measurement condition.

Today, the MRM measurement is also used for identification and quantification of target compounds included in biological samples, food, and soil. The biological samples, for example, contain hundreds to thousands of foreign compounds other than the target compounds.

In the compound database are only stored one or more candidates of MRM measurement condition (MRM transition—CE value set(s)) ultimately selected based on preliminary measurement results of every compound. On the other hand, any other information relating to the MRM transition—CE value set(s) (preliminary measurement results obtained based on MRM transitions and CE values irrelevant to the candidates of MRM measurement condition) is not stored in this database. All of the candidates of MRM measurement condition stored in the compound database, therefore, may possibly be affected by the foreign compounds (that is, none of the candidates of MRM measurement condition stored in the compound database may be usable). In such a case, an analyst may have to set new measurement conditions by changing at least one of the MRM transition and CE value and conduct exhaustive preliminary measurements under the set conditions to search candidates of MRM measurement condition that can be used with an actual sample. This requires a time-consuming labor.

To address the issue of the known art, the present invention provides a mass spectrometer operable to build a compound database that may facilitate a process to determine an MRM measurement condition for any target compound included in a sample containing numerous foreign compounds.

Solution to Problem

In order to solve the above problem, the present invention provides a mass spectrometer comprises a dissociation device that dissociates an ion, and mass separators respectively positioned on a front-stage and a rear-stage of the dissociation device. The mass spectrometer further comprises:

a) a storage in which a mass spectrometric data set relating to each of a plurality of compounds is prestored;

b) a precursor ion candidate selector that, in response to an instruction inputted by a user, selects one or more precursor ion candidates using the mass spectrometric data sets under a previously determined condition for each of a plurality of target compounds which are part or all of the plurality of compounds;

c) a product ion scan measurement condition setter that combines each of the precursor ion candidates with a plurality of candidate values of dissociation energy previously determined to set a plurality of product ion scan measurement conditions;

d) a product ion spectral data obtainer that carries out an MS/MS measurement under each of the plurality of product ion scan measurement conditions to obtain a product ion spectral data set;

e) a compound database file generator that generates, for each of the plurality of target compounds, a compound database file in which the product ion scan measurement conditions are associated with the product ion spectral data sets obtained under the product ion scan measurement conditions and that stores the compound database file in the storage; and f) an MRM measurement condition candidate generator that, for each of the plurality of target compounds, selects product ions from all the product ion spectral data sets under a condition previously determined, generates candidates of MRM measurement condition including a mass-to-charge ratio of each product ion, a mass-to-charge ratio of a precursor ion corresponding to the product ion, and the candidate value of dissociation energy and stores the candidates of MRM measurement condition in the storage.

The condition (the "previously determined condition") for the precursor ion candidate selector to select the precursor ion candidate may be, for example, selecting a predetermined number of precursor ions in the order of the greatest values of mass peak intensity, or selecting precursor ions with values of mass peak intensity greater than or equal to a predetermined value. The condition may be combined with another condition, for example, that a particular ion(s) (exclusion ion(s)) should not be selected as the precursor ion.

A similar condition may be set for the MRM measurement condition candidate generator to select the product ion.

The mass spectrometer according to the present invention, in response to an instruction inputted by a user, selects one or more precursor ion candidates based on mass spectrometric data sets of a plurality of target compounds prestored in the storage. Then, a product ion spectral data set is obtained for each of the precursor ion candidates under different conditions that differ in dissociation energy value, and candidates of MRM measurement condition are generated based on the obtained data sets. The candidates of MRM measurement condition generated at this stage are comparable to those stored in the conventional compound database.

In the mass spectrometer according to the present invention, the candidates of MRM measurement condition are not just generated but are generated and then associated with the product ion spectral data sets obtained through exhaustive measurements under conditions that differ in at least one of the MRM transition and the dissociation energy value, and are then compiled into the compound database. The compound database obtained then contains information on values of mass peak intensity of product ions produced from the precursor ion candidates and not selected by the MRM measurement condition candidate generator and information on values of mass peak intensity of product ions at values of dissociation energy not included in the candidates of MRM measurement condition in case none of the candidates of MRM measurement condition generated by the MRM measurement condition candidate generator can be used, other MRM measurement conditions may be searched by reading the product ion spectral data sets included in the compound database files to find a suitable MRM measurement condition.

The mass spectrometer according to the present invention preferably further includes:

g) a display device;

h) a mass spectrum display controller that, in response to any one of the plurality of target compounds being selected by the user, reads the mass spectrometric data set of the selected one of the plurality of target compounds from the storage and displays the mass spectrum on the display device, and shows a mass peak of the precursor ion candidate on the mass spectrum so as to distinguish from other mass peaks; and i) a product ion spectrum display controller that, in response to the mass peak distinguished on the mass spectrum being selected by the user, displays, on the display device, a product ion spectrum including a mass peak of a highest peak intensity among product ion spectra obtained through product ion scan measurements conducted at each of the plurality of the candidate values of dissociation energy using a precursor ion corresponding to the mass peak, and displays, on the display device, an intensity of the mass peak at each of the plurality of the candidate values of dissociation energy.

The mass peak to be displayed may be distinguished in various manners, for example, the mass peak may be displayed in color or in a hold line, or a mass-to-charge ratio may be displayed in proximity of the mass peak.

In the mass spectrometer provided, with the mass spectrum display controller and the product ion spectrum display controller, when a user selects one of the target compounds, the mass spectrum of the selected target compound is displayed on the display device. When the user selects the distinguished mass peak displayed on the display device, product ion spectrum obtained by using the precursor ion corresponding to the selected mass peak and the relationship between the mass peak intensity and the dissociation energy value are displayed on the display device. Thus, the user checks the mass peak intensity of each product ion and the relationship between the mass peak intensity and the dissociation energy by simply selecting any one of the mass peaks on the product ion spectrum and displayed mass spectrum, which may allow the user to readily determine a desired MRM measurement condition.

In the mass spectrometer according to the present invention, the product ion spectrum display controller may distinguish a mass peak displayed on a product ion spectrum that corresponds to the product ion included in the candidate of MRM measurement condition.

Such distinguished display of mass peaks (displayed in color or in a bold line, or flickered) may allow the user to instantly discern, among the mass peaks on the product ion spectrum displayed on the display device, a mass peak corresponding to the MRM transition included in the candidate of MRM measurement condition.

The mass spectrometer according to the present invention is preferably further characterized in that, in response to a mass spectrometric data set and a product ion spectral data set of a new compound being inputted to the mass spectrometer, the precursor ion candidate selector selects a precursor ion from the product ion spectral data and determines the precursor ion selected as the precursor ion candidate, the MRM measurement condition candidate generator selects product ions from the product ion spectral data under a condition previously determined and generates the candidate of MRM measurement condition including a mass-to-charge ratio of each product ion, a mass-to-charge ratio of a precursor ion corresponding to the product ion, and the candidate value of dissociation energy, and the compound database file generator updates the compound database using the mass spectrometric data, the product ion spectral data, the precursor ion candidate, and the candidate of MRM measurement condition.

The mass spectrometer according to the present invention preferably further includes j) an MRM measurement condition setter that, in response to the mass peak in the product ion spectrum displayed on the display device being designated by the user, determines a set of the precursor ion and the product ion corresponding to the mass peak as the MRM transition and that selects one of the candidate values of dissociation energy at which the product ion has a highest mass peak intensity and determines the one of the candidate values of dissociation energy as a dissociation energy value to set an MRM measurement condition.

Advantageous Effects of Invention

The mass spectrometer according to the present invention thus characterized may successfully generate, in addition to candidates of MRM measurement condition, a compound database file containing information in which a product ion scan measurement condition is associated with product ion spectral data obtained under this condition. A user may find none of candidates of MRM measurement condition useful at the time of conducting MRM measurement of a sample including numerous foreign compounds. Yet, the user, by referring to the product ion spectral data in the compound database, may readily determines a suitable MRM measurement condition for the target compound.

BRIEF DESCRIPTION OF DRAWINGS

FIG. 2 is a table showing an exemplified method file generated by the mass spectrometer according to the embodiment.

FIG. 5 is a drawing of an exemplified MRM measurement condition display screen in the mass spectrometer according to the embodiment.

DESCRIPTION OF EMBODIMENTS

An embodiment of the present invention is hereinafter described referring the accompanying drawings.

Figure 1:
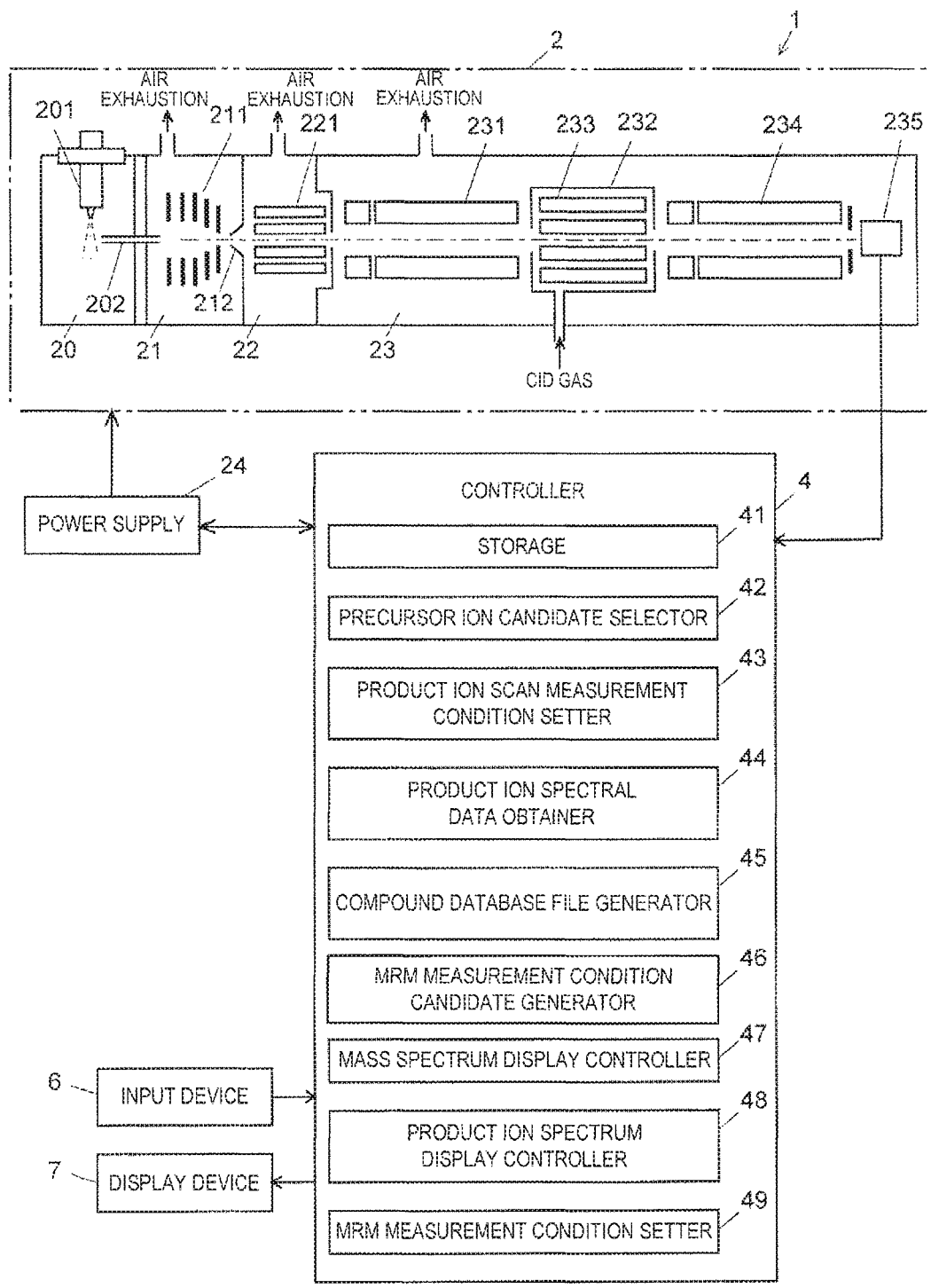
FIG. 1 is a block diagram illustrating principal elements of a mass spectrometer according to an embodiment of the present invention.

FIG. 1 is a block diagram illustrating principal elements of a mass spectrometer according to the embodiment. Principal elements of a mass spectrometer 1 according to this embodiment include a mass analyzer 2, a power source 24 that applies predetermined voltage to the mass analyzer 2, and a controller 4 that controls respective components of the mass analyzer 2 via the power source 24.

The mass analyzer 2 is configured as a multi-stage differential pumping system including an ionization chamber 20, an analysis chamber 23, and first and second intermediate vacuum chambers 21 and 22 in which the degree of vacuum is increased in phases. The ionization chamber 20 has a pressure substantially equal to atmospheric pressure. The analysis chamber 23 is a high-vacuum chamber vacuumized with a vacuum pump (not illustrated in the drawing). The vacuum chambers 21 and 22 are interposed between the ionization and analysis chambers. The ionization chamber 20 is equipped with a probe for electrospray ionization (ESI probe) 201 that sprays a sample-containing solution while applying electric charges to the solution. The ionization chamber 20 and the first intermediate vacuum chamber 21 positioned at rear of the ionization chamber 20 are intercommunicated with a thin heating capillary 202. The first intermediate vacuum chamber 21 and the second intermediate vacuum chamber 22 are separated with a skimmer 212 with fine pores formed at its top. Ion guides 211 and 221 are respectively disposed in the first and second intermediate vacuum chambers 21 and 22 to allow ions to be converged and transported to rear stages of the apparatus. In the analysis chamber 23 are disposed a front-stage quadrupole mass filter (Q1) 231, a collision cell 232 with a multipole ion guide (q2) 233 disposed inside, a rear-stage quadrupole mass filter (Q3) 234, and an ion detector 235. The quadrupole mass filters (Q1) 231 and (Q3) 234 are both provided to separate ions in accordance with mass-to-charge ratios and are spaced apart with the collision cell 232 interposed between these mass filters.

The collision cell 232 can be intermittently or continuously supplied with CID gas, for example, argon or nitrogen gas. The power source 24 applies predetermined voltages to the ESI probe 201, ion guides 211, 221, and 233, and quadrupole mass filters 231 and 234. The quadrupole mass filters 231 and 234 each have a pre-rod electrode on a front-stage of a main-rod electrode. The pre-rod electrode corrects disturbance of an electric field at its inlet end, and a voltage different from that applied to the main-rod electrode can be applied to the pre-rod electrode.

The mass analyzer 2 is operable to perform various measurements, including SIM (selective ion monitoring) measurement, product ion scanning measurement, and MRM (Multiple Reaction Monitoring) measurement. The SIM measurement, without using the front-stage quadrupole mass filter (Q1) 231 for ion selection (not functioned as a mass separator), detects ions passing through the rear-stage quadrupole mass filter (Q3) 234 using fixed mass-to-charge ratios.

On the other hand, the front-stage quadrupole mass filter (Q1) 231 and the rear-stage quadrupole mass filter (Q3) 234 are both used for mass filtering in the MS/MS scan measurement (product ion scan measurement) and the MRM measurement. The front-stage quadrupole mass filter (Q1) 231 only allows passage of ions defined as precursor ions. The CID gas is supplied into the collision cell 232 to dissociate the precursor ions and produce product ions. In the MS/MS scan measurement mass-to-charge ratio of ions passing through the rear-stage quadrupole mass filter (Q3) 234 is scanned, while the MRM measurement uses fixed mass-to-charge ratios for ions passing through the rear-stage quadrupole mass filter (Q3) 234.

The controller 4 has a storage 41 in which pieces of mass spectrometric data set of a plurality of compounds are stored. The controller 4 further includes, as functional blocks, a precursor ion candidate selector 42, a product ion scan measurement condition setter 43, a product ion spectral data obtainer 44, a compound database file generator 45, an MRM measurement condition candidate generator 46, a mass spectrum display controller 47, a product ion spectrum display controller 48, and an MRM measurement condition setter 49. The controller 4 also includes a functional element that controls the operations of the power source 24 and a CID gas supply unit (not illustrated in the drawing) in accordance with operations of the respective functional blocks. The controller 4 is typically a personal computer in which required software is installed. An input device 6 and a display device 7 are connected to the controller 4.

The operations of the respective elements of the mass spectrometer 1 according to this embodiment are hereinafter described.

First, a user selects one or more desired target compounds from the compounds stored in the storage 41. The compound (s) selected then may be part of or all of the compounds stored in the storage. After the target compounds are selected by the user, the precursor ion candidate selector 42, referring to the mass spectrometric data of these target compounds, sequentially selects a predetermined number of (for example, five) precursor ion candidates with greater values of mass peak intensity for each of the target compounds.

After the predetermined number of (for example, five) precursor ion candidates are selected for each of the target compounds, the product ion scan measurement condition setter 43 generates conditions for measurements (events) combined with a plurality of candidate values of dissociation energy (also referred to as collision energy candidate values or CE candidate values) previously determined for each of the precursor ion candidates. The CE candidate values may be initially set in the mass spectrometer or may be inputted by the user whenever necessary. ACE candidate value sharable among all of the target compounds (and precursor ion candidates) may be used, or different CE candidate values may be respectively used for the target compounds (or precursor ion candidates). In this embodiment, 10 CE candidate values, 5 eV to 50 eV, are used, which differ from one another by 5 eV. FIG. 2 is a drawing of an exemplified method file generated by the product ion scan measurement condition setter 43 to continuously carry out the MS/MS measurements under different conditions (events).

After the method file is generated, the product ion spectral data obtainer 44 carries out the events (product ion scan measurements) in the order that they are described in the method file to obtain product ion spectral data sets, and then stores the obtained data sets in the storage 41.

After all of the events are over and pieces of product ion spectral data sets of all of the events are stored in the storage 41, the compound database file generator 45 generates compound database files in which the target compounds, precursor ion candidates, and CE candidate values are associated with pieces of product ion spectral data sets and stores the generated compound database file in the storage 41.

After the compound database files are generated, the MRM measurement condition candidate generator 46, referring to all of the pieces of product ion spectral data sets, sequentially selects a predetermined number of mass peaks with greater values of intensity for each of the target compounds, determined a set of precursor ion, product ion, and CE candidate value corresponding to the mass peak. Then, the MRM measurement condition candidate generator 46 generates candidates of MRM measurement condition and stores them in the storage 41.

In the mass spectrometer 1 according to this embodiment, in response to input of a mass spectrometric data set and a product ion spectral data set of a new compound (including information of precursor ions and CE values in the measurement to obtain the product ion spectral data set), the precursor ion candidate selector 42 determined, based on the product ion spectral data sets, precursor ions used for the product ion scan measurement as the precursor ion candidates. The MRM measurement condition candidate generator 46 sequentially selects, from the product ion spectral data sets, a predetermined number of sets of product ions and CE candidate values with greater values of mass peak intensity and determines candidates of MRM measurement condition. After the precursor ion candidates and the candidates of MRM measurement condition are determined, the compound database file generator 45 adds the inputted mass spectrometric data sets, product ion spectral data sets, and candidates of MRM measurement condition of the new compound to the compound database and stores the updated compound database in the storage 41.

In the mass spectrometer according to this embodiment, when the user selects one or more target compounds, the precursor ion candidates are selected for the target compounds and associated with different CE candidate values, and exhaustive product ion scan measurements are carried out. Then, a predetermined number of candidates of MRM measurement condition are selected based on the product ion spectral data sets obtained from the measurements.

In the mass spectrometer according to the present invention, the candidates of MRM measurement condition are not just generated but are generated and associated with the product ion spectral data sets obtained through exhaustive measurements under conditions that differ in at least one of the MRM transition and CE value, and are then compiled into the compound database. In case none of the candidates of MRM measurement condition generated by the MRM measurement condition candidate generator 46 can be used, other MRM measurement conditions may be searched by reading the product ion spectral data set included in the compound database files stored in the storage 41 to find a suitable MRM measurement condition. The operation in this instance is specifically described below.

Figure 3:
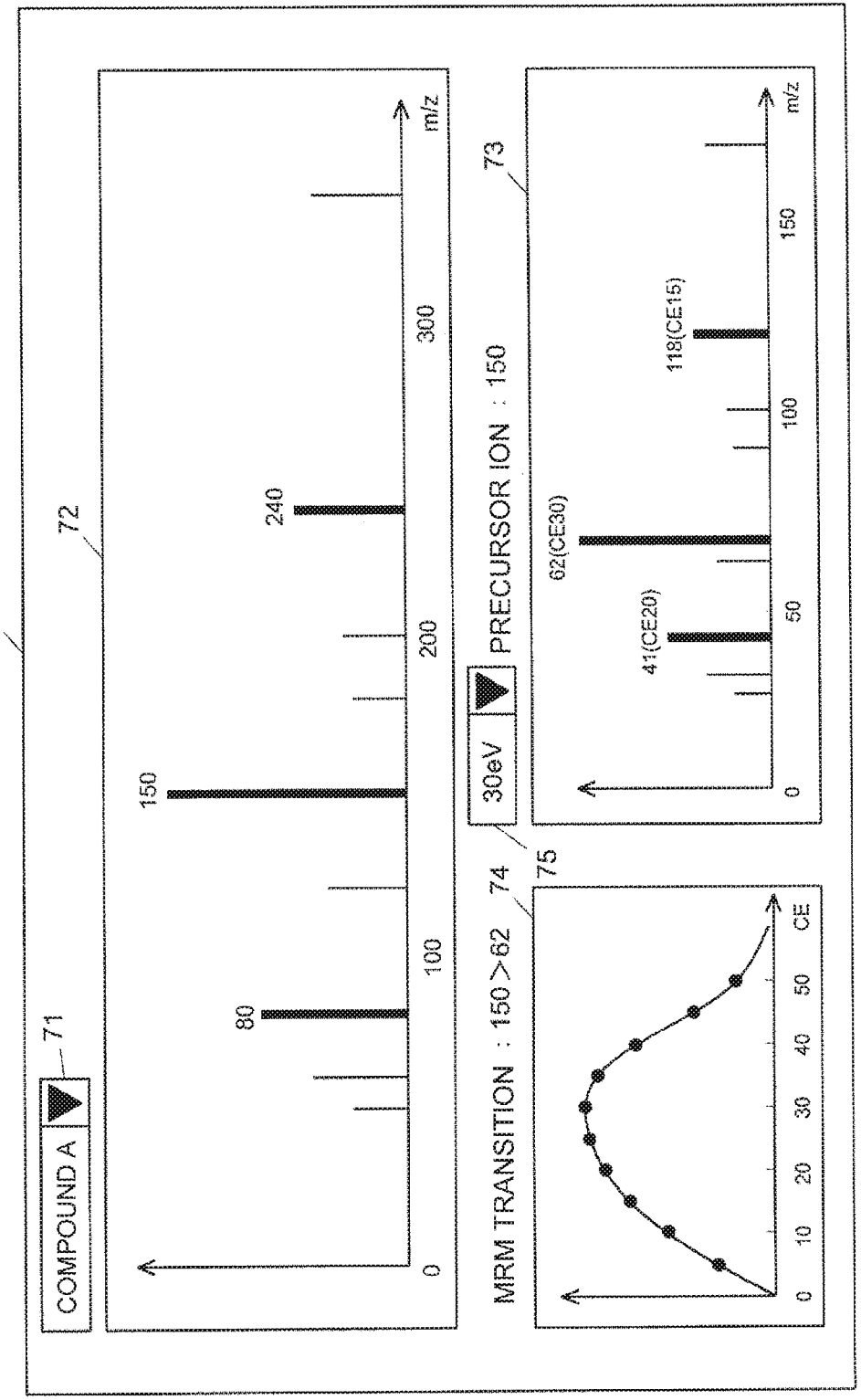
FIG. 3 is a drawing of an exemplified spectrum display screen in the mass spectrometer according to the embodiment.

FIG. 3 is a drawing of an exemplified spectrum display screen 70 on the display device 7.

When a user selects a target compound (for example, compound A) in a compound selecting section 71 displayed at the top of the spectrum display screen 70 on the display device 7, the mass spectrum display controller 47 reads mass spectrometric data set of the selected target compound from the storage 41 and displays the read data in a mass spectrum display region 72 on the display device 7.

The mass spectrum display controller 47 displays mass peaks highlighted in bold lines that correspond to precursor ion candidates selected by the precursor ion candidate selector 42 and displays their mass-to-charge ratios in proximity of the mass peaks. As for the precursor ion candidates selected by the precursor ion candidate selector 42, corresponding product ion spectral data set has been obtained and stored in the storage 41. To put it differently, a user, when selecting the mass peak highlighted in a bold line (distinguishable from the other mass peaks) on the mass spectrum displayed in the mass spectrum display region 72, can check the product ion spectrum relating to the precursor ion corresponding to the mass peak. This embodiment highlights a particular one(s) of the mass peaks in a bold line and additionally displays its mass-to-charge ratio to distinguish the mass peak from the other mass peaks. The selected mass peak may be distinguished otherwise, for example, may be displayed in color or flickered.

When the mass spectrum display controller 47 displays the mass spectrum of the target compound in the mass spectrum display region 72, the product ion spectrum display controller 48 initially displays, in a product ion spectrum display region 73, a product ion spectrum including a mass peak of a highest peak intensity among all of pieces of product ion spectral data sets obtained for the target compound. The product ion spectrum display controller 48 further displays mass peaks highlighted in bold lines that correspond to the MRM transitions included in the candidates of MRM measurement condition, and also displays their mass-to-charge ratios and CE value at which the product ions are detectable with a highest intensity.

In the example illustrated in FIG. 3, three mass peaks are highlighted in bold lines, which teaches that MRM transitions corresponding to these mass peaks are included in the candidates of MRM measurement condition. This drawing indicates, as for MRM transition with the mass-to-charge ratios 41 and 118, a highest detection intensity is obtained at a CE value that differs from the displayed CE value (30 eV) (highest detection intensity at the CE value 20 eV for product ion of the mass-to-charge ratio 41, highest detection intensity at the CE value 15 eV for product ion of the mass-to-charge ratio 118).

The product ion spectrum display controller 48 initially displays, in a CE value display region 74, a graphical representation of values of detected intensity at a plurality of CE values as for the MRM transition corresponding to a mass peak of a highest intensity among the product ion spectrum displayed in the product ion spectrum display region 73. Then, the user is allowed to check a relationship between a detection intensity and CE value in the product ion spectrum.

In the screen illustrated in FIG. 3, when the user selects one of the mass peaks highlighted in bold lines in the mass spectrum display region 72, the product ion spectrum of a precursor ion candidate corresponding to the selected mass peak is displayed in the product ion spectrum display region 73. When the user selects one mass peak displayed in the product ion spectrum display region 73, a relationship between the selected mass peak intensity and CE value is displayed in the CE value display region 74.

Figure 4:
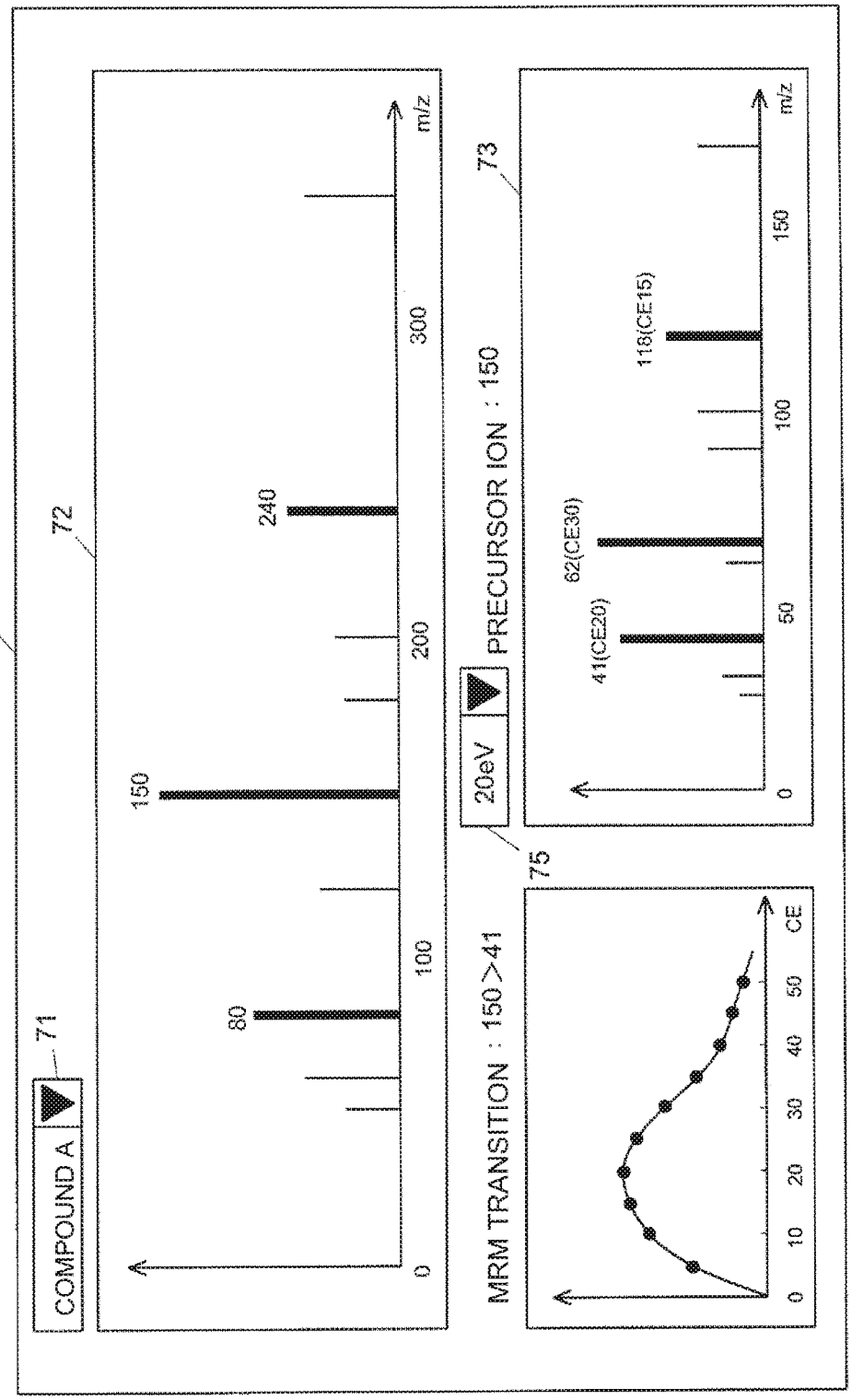
FIG. 4 is a drawing of another exemplified spectrum display screen in the mass spectrometer according to the embodiment.

FIG. 4 shows an exemplified display when the mass peak of the mass-to-charge ratio 41 is selected in the product ion spectrum on the screen illustrated in FIG. 3. When the mass peak of the product ion is selected, the product ion spectrum showing a highest detection intensity of the mass peak (in this embodiment, product ion spectrum obtained at the CE value of 20 eV) is displayed, and what is displayed in the CE value display region 74 is switched to data of the relevant MRM transition (a set of mass-to-charge ratio 150 of precursor ion and mass-to-charge ratio 41 of product ion). The user is allowed to change the CE value in a CE value selecting section 75, in which case the user can check a product ion spectrum obtained under the changed CE value.

In the mass spectrometer according to this embodiment, the user is allowed to readily check not only candidates of MRM measurement condition but also values of mass peak intensity of other product ions and a relationship between a mass peak intensity and CE value by simply selecting any one of the mass peaks in the product ion spectrum or displayed mass spectrum. In case none of the MRM measurement conditions is allowed to use due to numerous foreign compounds as in biological samples or food, any other suitable MRM measurement condition may be readily searched and found.

In the mass spectrometer 1 according to this embodiment, when the user double-clicks the mass peak on the product ion spectrum displayed in the product ion spectrum display region 72, the MRM measurement condition setter 49 displays the MRM measurement condition display screen 76, an example of which is illustrated in FIG. 5, on the spectrum display screen 70, and then displays, on this screen 76, a list of MRM measurement conditions to which the MRM transition and the CE value corresponding to the selected mass peak are added. When the user double-clicks one of the listed MRM measurement conditions displayed on the MRM measurement condition display screen 76, the clicked condition is deleted from the list. When the user presses the "GO" button after the list of MRM measurement conditions is displayed, a method file for executing the measurement under the listed MRM measurement conditions is generated and stored in the storage 41. In the mass spectrometer 1 according to this embodiment, the user, by simply performing double-click actions, is allowed to readily determine the MRM measurement condition to be selected and generate a method file.

The present invention includes but is not limited to the embodiment described thus far, and various modifications may be made to this embodiment within the technical scope described herein.

In the process to select the precursor ion candidates, for example, all of the precursor ions with values of mass peak intensity greater than or equal to a predetermined value may be selected, instead of sequentially selecting the precursor ions with greater values of mass peak intensity. An additional condition may be further set, for example, excluding ions of a particular mass-to-charge ratio from targets to be selected. Similarly, the MRM measurement condition candidate generator may select all of the product ions with values of mass peak intensity greater than or equal to a predetermined value (in combination with corresponding precursor ions) to provide candidates of MRM measurement condition.

FIGS. 3 to 5 illustrate exemplified display screens described in the embodiment. The user may check information including the mass spectrum, product ion spectrum, and CE values in any other suitable manners. The user may perform other actions, instead of double clicking, to decide candidates of MRM measurement condition (for example, drag-and-drop).

While the embodiment describes a triple quadrupole mass spectrometer, a suitable one selected from mass spectrometers configured otherwise may be used, insofar as they are equipped with front- and rear-stage mass separators and a collision cell.

REFERENCE SIGNS LIST

1 . . . Mass Spectrometer
2 . . . Mass Analyzer
20 . . . Ionization Chamber
201 . . . ESI Probe
202 . . . Heating Capillary
21 . . . First intermediate Vacuum Chamber
211 . . . Ion Guide
212 . . . Skimmer
22 . . . Second Intermediate Vacuum Chamber
23 . . . Analysis Chamber
231 . . . Quadrupole Mass Filter
232 . . . Collision Cell
235 . . . Ion Detector
24 . . . Power Source
4 . . . Controller
41 . . . Storage
42 . . . Precursor ion Candidate Selector 43 . . . Product Ion Scan Measurement Condition Setter
44 . . . Product Ion Spectral Data Obtainer
45 . . . Compound Database File Generator
46 . . . MRM Measurement Condition Candidate Generator
47 . . . Mass Spectrum Display Controller
48 . . . Product Ion Spectrum Display Controller
49 . . . MRM Measurement Condition Setter
6 . . . Input Device
7 . . . Display Device
70 . . . Spectrum Display Screen
71 . . . Compound Selecting Section
72 . . . Mass Spectrum Display Region
73 . . . Product Ion Spectrum Display Region
74 . . . CE Value Display Region
75 . . . CE Value Selecting Section
76 . . . MRM Measurement Condition Display Screen

The invention claimed is:

1. A mass spectrometer comprising:
a dissociation device that dissociates an ion; and
mass separators respectively positioned on a front-stage and a rear-stage of the dissociation device,
the mass spectrometer further comprising:
a) a storage in which mass spectrometric data set relating to each of a plurality of compounds is prestored;
b) a precursor ion candidate selector that, in response to an instruction inputted by a user, selects one or more precursor ion candidates using the mass spectrometric data sets under a previously determined condition for each of a plurality of target compounds which are part or all of the plurality of compounds;
c) a product ion scan measurement condition setter that combines each of the precursor ion candidates with a plurality of candidate values of dissociation energy previously determined to set a plurality of product ion scan measurement conditions;
d) a product ion spectral data obtainer that carries out an MS/MS measurement under each of the plurality of product ion scan measurement conditions to obtain a product ion spectral data set;
e) a compound database file generator that generates, for each of the plurality of target compounds, a compound database file in which the product ion scan measurement conditions are associated with the product ion spectral data sets obtained under the product ion scan measurement conditions and that stores the compound database file in the storage; and
f) an MRM measurement condition candidate generator that, for each of the plurality of target compounds, selects product ions from all the product ion spectral data sets under a condition previously determined, generates candidates of MRM measurement condition including a mass-to-charge ratio of each product ion, a mass-to-charge ratio of a precursor ion corresponding to the product ion, and the candidate value of dissociation energy, and stores the candidates of MRM measurement condition in the storage.

2. The mass spectrometer according to claim 1, further comprising:
g) a display device;
h) a mass spectrum display controller that, in response to any one of the plurality of target compounds being selected by the user, reads the mass spectrometric data set of the selected one of the plurality of target compounds from the storage, displays the mass spectrum on the display device, and shows a mass peak of the precursor ion candidate on the mass spectrum so as to distinguish from other mass peaks; and
i) a product ion spectrum display controller that, in response to the mass peak distinguished on the mass spectrum being selected by the user, displays, on the display device, a product ion spectrum including a mass peak of a highest peak intensity among product ion spectra obtained through product ion scan measurements conducted at each of the plurality of the candidate values of dissociation energy using a precursor ion corresponding to the mass peak, and displays, on the display device, an intensity of the mass peak at each of the plurality of candidate values of dissociation energy.

3. The mass spectrometer according to claim 2 wherein the product ion spectrum display controller distinguishes a mass peak displayed on a product ion spectrum that corresponds to the product ion included in the candidate of MRM measurement condition.

4. The mass spectrometer according to claim 2, further comprising
j) an MRM measurement condition setter that, in response to the mass peak in the product ion spectrum displayed on the display device being designated by the user, determines a set of the precursor ion and the product ion corresponding to the mass peak as the MRM transition and that selects one of the plurality of candidate values of dissociation energy at which the product ion has a highest mass peak intensity and determines the one of the candidate values of dissociation energy as a dissociation energy value to set an MRM measurement condition.

5. The mass spectrometer according to claim 1, wherein, in response to a mass spectrometric data set and a product ion spectral data set of a new compound being inputted to the mass spectrometer,
the precursor ion candidate selector selects a precursor ion from the product ion spectral data and determines the precursor ion selected as the precursor ion candidate,
the MRM measurement condition candidate generator selects product ions from the product ion spectral data under a condition previously determined and generates the candidate of MRM measurement condition including a mass-to-charge ratio of the product ion, a mass-to-charge ratio of a precursor ion corresponding to the product ion, and the candidate value of dissociation energy, and
the compound database generator updates the compound database using the mass spectrometric data, the product ion spectral data, the precursor ion candidate, and the candidate of MRM condition.

6. The mass spectrometer according to claim 2, wherein, the user may select any one of the mass peaks in the product ion spectrum or displayed mass spectrum to check values of mass peak intensity of other product ions and a relationship between the mass peak intensity and the candidate values of dissociation energy.

* * * * *